United States Patent
Hiironniemi

(10) Patent No.: US 7,545,814 B2
(45) Date of Patent: Jun. 9, 2009

(54) METHOD AND SYSTEM FOR DYNAMIC REMAPPING OF PACKETS FOR A ROUTER

(75) Inventor: Outi Hiironniemi, Espoo (FI)

(73) Assignee: Nokia Corporation, Epsoo (FI)

( * ) Notice: Subject to any disclaimer, the term of this patent is extended or adjusted under 35 U.S.C. 154(b) by 1562 days.

(21) Appl. No.: 10/086,780

(22) Filed: Feb. 28, 2002

(65) Prior Publication Data

US 2003/0161311 A1 Aug. 28, 2003

(51) Int. Cl.
*H04L 12/56* (2006.01)
(52) U.S. Cl. .............. 370/395.41; 370/237; 370/412; 370/428; 710/52
(58) Field of Classification Search ............ 370/237, 370/395.41, 412, 428; 710/52
See application file for complete search history.

(56) References Cited

U.S. PATENT DOCUMENTS

| | | | | |
|---|---|---|---|---|
| 5,231,633 A | 7/1993 | Hluchyj et al. | ............ | 370/94.1 |
| 5,561,663 A | 10/1996 | Klausmeier | ................. | 370/17 |
| 6,148,010 A * | 11/2000 | Sutton et al. | ................ | 370/536 |
| 6,160,811 A | 12/2000 | Partridge et al. | ............ | 370/401 |
| 6,292,489 B1 | 9/2001 | Fukushima et al. | ......... | 370/401 |
| 6,324,584 B1 | 11/2001 | Mandalia | .................... | 709/238 |
| 6,473,815 B1 * | 10/2002 | Lu et al. | ...................... | 710/52 |
| 6,600,752 B1 * | 7/2003 | Duong-Van | ................. | 370/412 |
| 6,601,150 B1 * | 7/2003 | Scheinbart et al. | ......... | 711/156 |
| 6,654,363 B1 * | 11/2003 | Li et al. | ...................... | 370/338 |
| 6,822,940 B1 * | 11/2004 | Zavalkovsky et al. | ....... | 370/237 |

* cited by examiner

*Primary Examiner*—William Trost, IV
*Assistant Examiner*—Toan D Nguyen
(74) *Attorney, Agent, or Firm*—Squire, Sanders & Dempsey, LLP

(57) ABSTRACT

The invention provides a method and system for relieving temporal overload conditions in a router when weighted queues are employed to forward packets to their next destination. Typically, a received packet is mapped to a weighted queue that is associated with the kind of data included in the packet. The invention employs a threshold value to determine when an overloading condition of a weighted queue is so severe that high priority packets are in danger of being dropped. As long as this condition occurs, the invention will remap higher priority packets from a weighted queue associated with the kind of data included in the packets to another weighted queue that is not as loaded and which normally would not be associated with kind of data included in the packets at risk of being dropped.

22 Claims, 8 Drawing Sheets

$$IF \quad \frac{L_1}{w_1} - \frac{L_2}{w_2} > R_{threshold} \quad THEN$$

IF ( T(X) = 1 AND F(X) = 2 ) THEN

MAP THE PACKET TO QUEUE 1

ELSE

MAP THE PACKET TO QUEUE 2

<u>REMAPPING EQUATION 1</u>

*Fig. 7*

| SYMBOL | NAME | COMMENT |
|---|---|---|
| $L_1$ | LOAD IN QUEUE 1 | |
| $L_2$ | LOAD IN QUEUE 2 | |
| $w_1$ | WEIGHT FOR QUEUE 1 | |
| $w_2$ | WEIGHT FOR QUEUE 2 | |
| $R_{threshold}$ | REMAPPING THRESHOLD | CONFIGURATION VALUE, GREATER THAN ZERO |
| $T(X)$ | TRAFFIC AGGREGATE TYPE OF PACKET X | WHEN $T(X) = 1$, PACKET X IS MAPPED TO QUEUE 1; WHEN $T(X) = 2$, PACKET X IS MAPPED TO QUEUE 2 |
| $F(X)$ | FORWARDING PRIORITY OF PACKET X | WHEN $F(X) = 1$, PACKET X HAS HIGH FORWARDING PRIORITY; WHEN $F(X) = 2$, PACKET X HAS LOW FORWARDING PRIORITY |

*Fig. 8*

METHOD AND SYSTEM FOR DYNAMIC REMAPPING OF PACKETS FOR A ROUTER

FIELD OF THE INVENTION

The invention relates generally to implementing multiple service support in a network, and more particularly to dynamically mapping packets into weighted queues for a router.

BACKGROUND OF THE INVENTION

The Internet is arranged so that a computing device can have a unique name or address by which it can be identified. When data is transmitted over the Internet between computing devices, it is generally broken down into smaller groupings called "packets". In addition to the data which is being transmitted, the packets will normally include important transmission information such as the sender's identity or Internet Packet Address (IP Address), the addressee or intended recipient's IP Address, the actual data (or data request), and so on.

Each packet transmitted from a user's computing device will typically travel through several network devices such as hubs, switches, and routers. If a user's computing device is part of a local area network, the packet will generally travel along a cable until it arrives at a hub to which the cable is connected. The hub or "repeater" as it is sometimes called, will retransmit the packet to another network device (such as a switch) until the packet reaches a router. The router examines the information transmitted with the packet and determines the best way for it to get to its destination.

Once the router has determined how the packet is to be sent, it selects another router at some other location and transmits the message to the router in the direction the packet is intended to travel. For example, if the message is going from New York to California, the router might send the packet to a router located in an intermediate city such as Chicago along a high speed communication channel. Once there, another router will determine a subsequent router to which the packet will be sent next. In this way, the packet is transmitted from router to router until the packet has nearly reached its destination.

When the packet is near to its destination, it is eventually passed to a local hub, which retransmits the message to its intended recipient computing device. The recipient computing device then reassembles the packet with other parts of the original message to create the complete set of transmitted data. Thus, a router functions in a network by connecting wide area networks and local area networks to allow traffic and communication of packet information to be transmitted to selected destinations.

In addition, there are different types of routers that may be used in a given network. For instance, one type of router may employ a first-in-first-out (FIFO) buffer to schedule the forwarding of packets. In this case, the packet forwarding is generally dictated by the dynamic properties of TCP (Transmission Control Protocol), which is the transport protocol used in most IP networks. Another type of router may forward different types of packet flows with weighted queues that are associated with a differentiated service (DiffServ). This type of router is often used to provide minimum bandwidth guarantees for particular flows of packets while achieving a very high level of resource utilization. These packet flows could include data for streaming media, signaling and interactive, e.g., file transfers and browsing.

However, when a particular weighted queue reaches maximum capacity due to some overload condition, packets in the queue are typically dropped by the router, i.e., the packets are discarded and not forwarded to their destination. Packets associated with a particular flow in a weighted queue that is overloaded may be dropped even when another weighted queue associated with a different flow of packets may be operating at less than maximum capacity. Accordingly, while an overload condition occurs, it would be desirable to shift a flow of packets from an overloaded weighted queue to another weighted queue that is under utilized until the overload condition ends. It is with respect to these considerations and others that the present invention has been made.

SUMMARY OF THE INVENTION

The present invention is directed at addressing the above-mentioned shortcomings, disadvantages and problems, and will be understood by reading and studying the following specification.

According to one aspect of the invention, a method is provided for managing the forwarding of packets to a final destination. Each received packet is mapped to at least one of a plurality of queues. The mapping is based on a kind of data included with each packet. A threshold value is provided that is compared to a differential value, which represents loading differences between a queue associated with the kind of data included in a received packet and another queue that is unassociated with the kind of data included in the received packet. The queue associated with the kind of data included in the received packet is overloaded when the differential value exceeds the threshold value. When the differential value exceeds the threshold value and operational logic is valid, the mapping of the received packet is automatically changed from the queue to the other queue. Also, the other queue is less loaded than the queue associated with the kind of data included in the packet when the differential value exceeds the threshold value. Each packet in each queue is forwarded along a path towards the final destination. The ordering of the forwarding of each packet is in accordance with a weight associated with each queue.

In according with another aspect of the invention, a weight is provided for each queue that is associated with each kind of data. Resources for forwarding each received packet in each queue are allocated in accordance with each weight provided to each queue.

In according with yet another aspect of the invention, a remapping equation can be employed to determine when simultaneously the differential value exceeds the threshold value and operational logic is valid. Also, the operational logic can be employed to determine when both a forwarding priority value and a traffic aggregation value are greater for the received packet initially mapped to the queue associated with the kind of data included with the received packet than another forwarding priority value and another traffic aggregation value associated with each packet in the other queue that is unassociated with the kind of data included in the received packet.

In according with still another aspect of the invention, automated provisioning is enabled for at least one of a forwarding priority value, traffic aggregation value and weight for each queue based on the kind of data included in each packet.

In accordance with a still further aspect of the invention, the threshold is set to a relatively large value to prevent overloading of the other queue caused by relatively frequent changing of the mapping of received packets to the other queue.

In accordance with another aspect of the invention, a connection associated with the received packet is used to determine the kind of data included in the received packet. Also, the content of the received packet can be examined to identify the kind of data included in the received packet. Additionally, the packet may be one of an Internet Protocol (IP) packet and an Asynchronous Transfer Mode (ATM) packet.

In accordance with yet another aspect of the invention, an apparatus such as a router may be employed to implement substantially all of the methods described above. The router can be coupled to several different types of networks in different ways. Also, the router may be included in a base station that enables wireless communication with mobile devices.

BRIEF DESCRIPTION OF THE DRAWINGS

FIG. 7 shows an illustration of exemplary remapping equation; and

FIG. 8 illustrates a table that provides detailed information regarding the variables employed by the exemplary remapping equation, in accordance with the invention.

DETAILED DESCRIPTION OF THE PREFERRED EMBODIMENT

Figure 1:
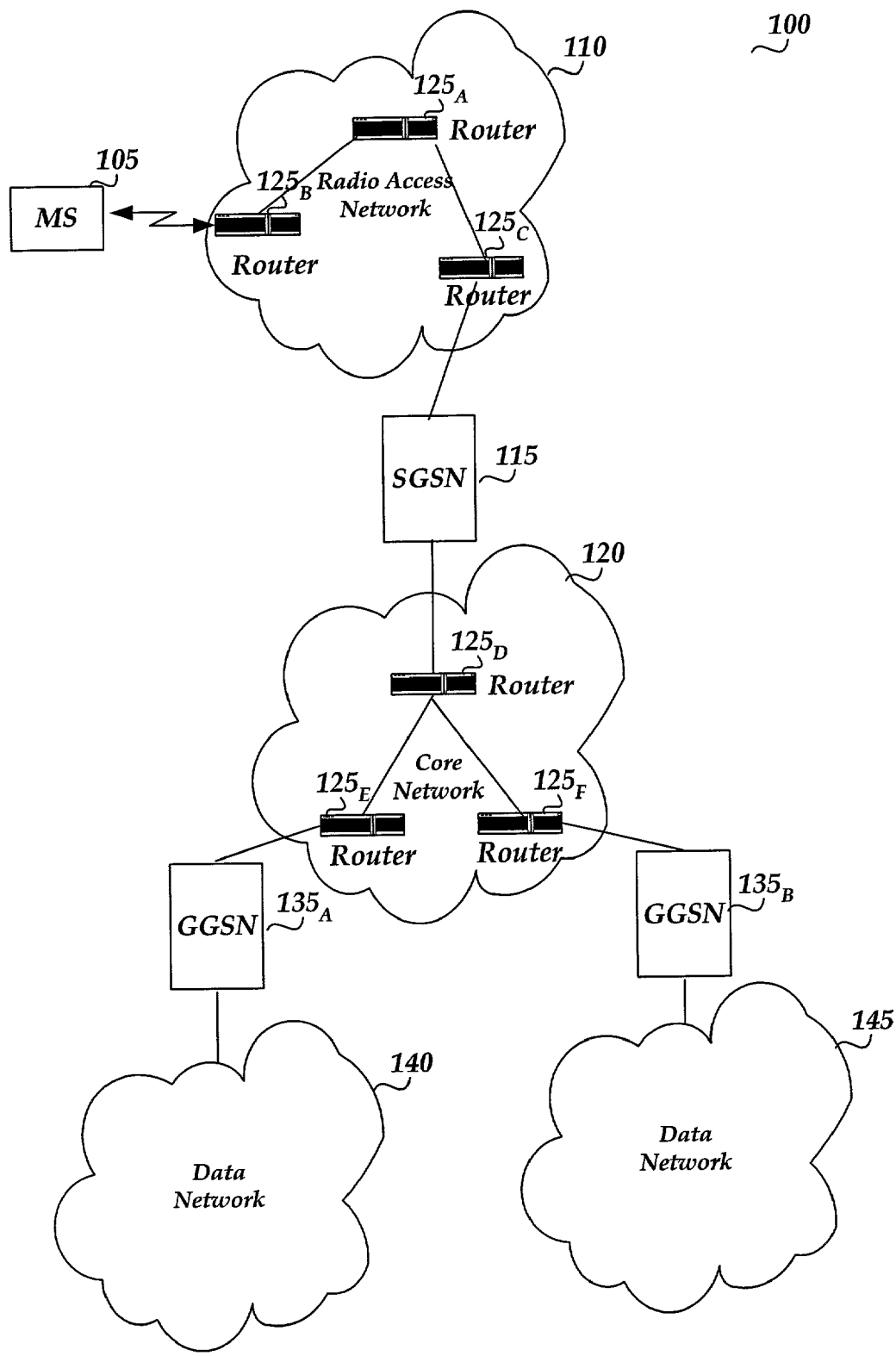
FIG. 1 illustrates an exemplary mobile IP network in which the invention may operate.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "node" refers to a network element that monitors a load for a link within a path. The term "link load" refers to the load associated with the node. The term "flow" means a flow of packets. The term support node refers to both "GGSN" and "SGSN" nodes. The term "user" refers to any person or customer such as a business or organization that employs a mobile device to communicate or access resources over a mobile network. The term "operator" refers to any technician or organization that maintains or services a packet based network. The term "identifier" includes an MSISDN number, an IP address, or any other information that relates to the location or identity of the user.

The term "router" refers to a dedicated network element that receives packets and forwards them to their destination. In particular, a router is used to extend or segment networks by forwarding packets from one logical network to another. A router typically operates at layer 3 and below of the Open Systems Interconnection (OSI) reference model for networking. However, some routers can provide additional functionality that operates above layer 3 of the OSI reference model.

Generally, a router is aware of multiple paths that a received packet can take to its final destination. Based on the logical address included in a received packet, a router will forward the packet along an optimal path towards its final destination. Typically, a router contains internal tables of information called routing tables that keep track of all known network addresses and possible paths throughout the internetwork, along with the cost of reaching each logical network. A router optimally routes packets based on the available paths and their costs, thus taking advantage of redundant paths that can exist in a mesh topology network. Some routers have static routing tables that must be manually configured with all network addresses and paths in the internetwork. Other routers are capable of automatically/dynamically creating their own routing tables by listening to network traffic.

Referring to the drawings, like numbers indicate like parts throughout the views. Additionally, a reference to the singular includes a reference to the plural unless otherwise stated or is inconsistent with the disclosure herein.

The invention provides a method and system for temporal overload conditions in a router when weighted queues are employed to forward packets to their next destination. Typically, a received packet is mapped to a weighted queue that is associated with the kind of data included in the packet. The invention employs a threshold value to determine when an overloading condition of a weighted queue is so severe that high priority packets are in danger of being dropped. As long as this condition occurs, the invention will remap higher priority packets from a weighted queue associated with the kind of data included in the packets to another weighted queue that is not as loaded and which normally would not be associated with kind of data included in the packets at risk of being dropped. In one embodiment, an operator determines traffic aggregation and forwarding priority values for packets that include particular kinds of data, sets the weight for each queue and associates each queue with packets that include a particular kind of data. In another embodiment, an automated mechanism may determine and set at least a portion of these values, weights and associations.

A particular weight for a queue corresponds to the share of available resources (bandwidth) that will be allocated to process any packets in the queue. For example, one queue may be allocated (weighted) 60% of the available bandwidth and another queue may be allocated 40%. In this way, 60% of the available resources are always allocated to forwarding packets in the first queue regardless of how much of the actual traffic is directed to the first queue. A weighted queue mechanism guarantees that all different kinds of packet traffic receive at least some resources for forwarding to their ultimate destination.

However, difficulties arise when a greater percentage of the traffic is directed to a queue that is allocated significantly less resources, e.g., high priority packets of data may be dropped and not forwarded at all. Typically, the kind of data included in the packet is used to determine the forwarding priority for that particular packet. For example, signal and control data may receive the highest priority while web browsing data may receive the lowest forwarding priority.

Illustrative Operating Environment

With reference to FIG. 1, an exemplary mobile IP network in which the invention may operate is illustrated. As shown in the figure, mobile IP network 100 includes mobile device 105, radio access network (RAN) 110, SGSN 115, core network 120, routers $125_{A-F}$, optional bandwidth broker (BB) 300, GGSNs $135_{A-B}$, data network 140, and data network 145.

The connections and operation for mobile IP network 100 will now be described. Mobile device 105 is coupled to radio access network (RAN) 110. Generally, mobile device 105 may include any device capable of connecting to a wireless network such as radio access network 110. Such devices include cellular telephones, smart phones, pagers, radio frequency (RF) devices, infrared (IR) devices, integrated devices combining one or more of the preceding devices, and the like. Mobile device 105 may also include other devices that have a wireless interface such as Personal Digital Assistants (PDAs), handheld computers, personal computers, multiprocessor systems, microprocessor-based or programmable consumer electronics, network PCs, wearable computers, and the like.

Radio Access Network (RAN) 110 manages the radio resources and provides the user with a mechanism to access core network 120. Radio access network 110 transports information to and from devices capable of wireless communication, such as mobile device 105. Radio access network 110 may include both wireless and wired telecommunication components. For example, radio access network 110 may include a cellular tower and/or base stations that are linked to a wired telecommunication network. Typically, the cellular tower carries wireless communication to and from cell phones, pagers, and other wireless devices, and the wired telecommunication network carries communication to regular phones, long-distance communication links, and the like. As shown in the figure, RAN 110 includes routers $125_{A-C}$.

According to one embodiment of the invention, routers $125_{A-C}$ may calculate their own link loads as well as process link loads relating to other nodes on the network. The routers may send a warning message to other routers within the network when its link load exceeds a configurable threshold. In yet another embodiment, one or more of routers $125_{A-C}$ may be configured as an internal router for a base station that is coupled to a wired telecommunication network and in communication with wireless devices such as mobile device 105.

Some nodes may be General Packet Radio Service (GPRS) nodes. For example, Serving GPRS Support Node (SGSN) 115 may send and receive data from mobile stations, such as mobile device 105, over RAN 110. SGSN 115 also maintains location information relating to MS 105. SGSN 115 communicates between mobile device 105 and Gateway GPRS Support Node (GGSN)s $135_{A-B}$ through core network 120. According to one embodiment of the invention, BB 300 communicates with RAN 110 and core network 120.

Core network 120 is an IP packet based backbone network that includes routers, such as routers $^{125}$D-F, to connect the support nodes in the network. Routers are intermediary devices on a communications network that expedite message delivery. On a single network linking many computers through a mesh of possible connections, a router receives transmitted messages and forwards them to their correct destinations over available routes. Routers may be a simple computing device or a complex computing device. For example, a router may be a computer including memory, processors, and network interface units.

GGSNs $135_{A-B}$ are coupled to core network 120 through routers $125_{A-C}$ and act as wireless gateways to data networks, such as network 140 and network 145. Networks 140 and 145 may be the public Internet or a private data network. GGSNs $135_{A-B}$ allow mobile device 105 to access network 140 and network 145.

Furthermore, computers, and other related electronic devices may be connected to network 140 and network 145. The public Internet itself may be formed from a vast number of such interconnected networks, computers, and routers. Mobile IP network 100 may include many more components than those shown in FIG. 1. However, the components shown are sufficient to disclose an illustrative embodiment for practicing the present invention.

The media used to transmit information in the communication links as described above illustrate one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
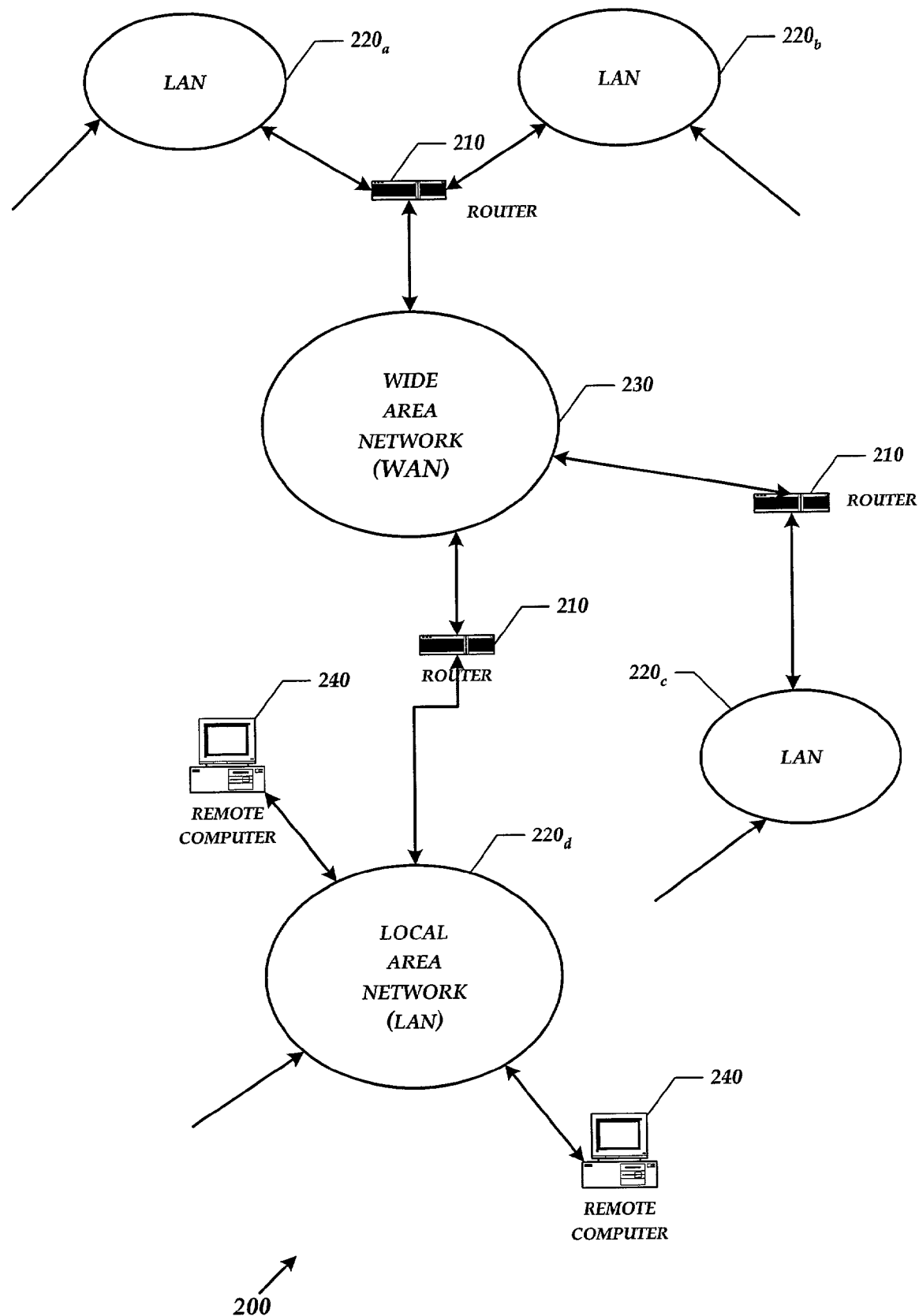
FIG. 2 shows a schematic diagram that illustrates an exemplary system overview in which local area networks and a wide area network are interconnected by routers.

FIG. 2 shows another exemplary system in which the invention operates in which a number of local area networks ("LANs") $220_{a-d}$ and wide area network ("WAN") 230 interconnected by routers 210. On an interconnected set of LANs—including those based on differing architectures and protocols—, a router acts as a link between LANs, enabling messages to be sent from one to another.

Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links. Furthermore, computers, such as remote computer 240, and other related electronic devices can be remotely connected to either LANs $220_{a-d}$ or WAN 230 via a modem and temporary telephone link. The number of WANs, LANs, and routers in FIG. 2 may be increased or decreased without departing from the spirit or scope of this invention. As such, the Internet itself may be formed from a vast number of such interconnected networks, computers, and routers and that an embodiment of the invention could be practiced over the Internet without departing from the spirit and scope of the invention.

Figure 3:
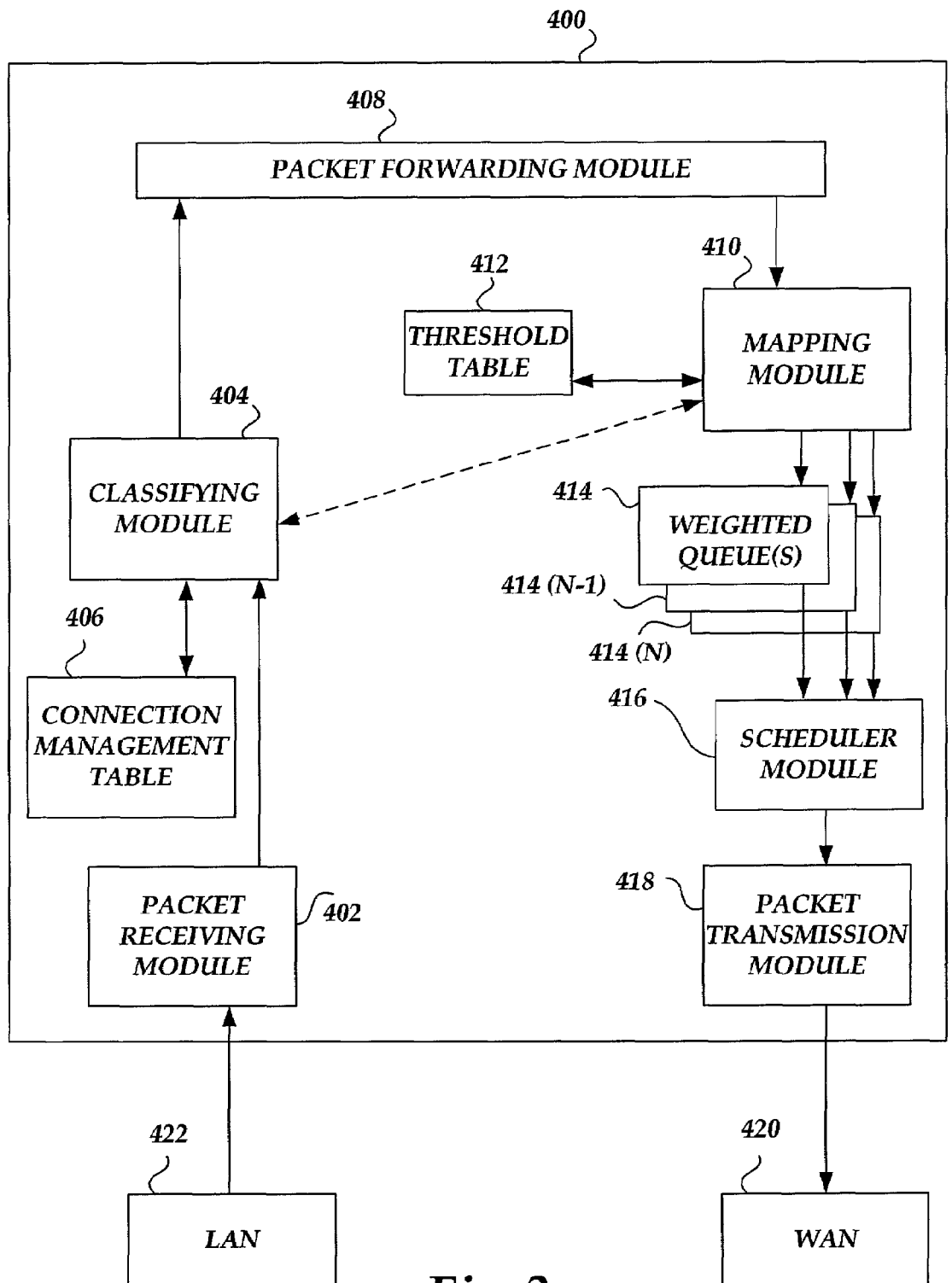
FIG. 3 shows a functional block diagram of a router that is operative to remap packets from an initial queue to another queue under certain loading conditions.

FIG. 3 shows a functional block overview of at least some of the modules, tables and queues that are employed in the operation of external router 400. Although router 400 is shown connected between LAN 422 and WAN 420, it is understood that this is just an exemplary illustration. In another embodiment, several types of logical networks could be simultaneously coupled to router 400. The configuration related to the processing of received packets includes packet receiving module 402 for receiving each packet from LAN 422 and storing it in a buffer; packet classifying module 404 for determining the kind of data associated with each received IP packet; and a connection management table 406 used for determining the kind of data included with received packets from a particular connection.

In addition, the configuration relating to the processing of packets for transmission includes packet forwarding module 408 for generally processing the forwarding of packets to another destination, mapping module 410, threshold table 412, "N" queues 414 that are classified by weights, scheduler module 416 and packet transmission module 418, which is coupled to WAN 420.

An IP packet received by router 400 over LAN 422 is received at packet receiving module 402 where it is initially stored in a vacant area in a buffer. Classifying module 404 determines if the connection associated with the aforesaid packet is registered in the connection management table 406. If so, classifying module 404 determines the kind of data associated with the aforesaid packet on the basis of information in connection management table 406 and provides the packet to packet forwarding module 408. Although not shown in FIGS. 3 or 4, in another embodiment, packet forwarding module 408 may be coupled between packet receiving module 402 and classifying module 404. In this case, each packet is first processed by packet forwarding module 408 and then provided to classifying module 404 for further processing.

In the case that the aforesaid connection is not yet registered in the connection management table 406, classifying module 404 can determine whether or not the forwarding of a packet from the connection is permitted. Then, in the case that it is permitted, the packet is provided by classifying module 404 to packet forwarding module 408 for further processing. Otherwise, the packet is dropped. Also, when the forwarding of the packet from the connection is permitted, classifying module 404 determines the kind of data included in the packet. When the kind of data included in a packet is known, classifying module 404 communicates this information to mapping module 410. Additionally, the kinds of packet data may include signal, voice, streaming media, email and web browsing. In one embodiment, classifying module 404 assigns the highest forwarding priority to signal and voice data, while email and browser data are given the lowest forwarding priority.

Packet forwarding section 408 determines where to forward the packet (next destination) and provides the packet to mapping module 410. Based on the kind of data included in the packet (this information is provided by classifying module 404), mapping module 410 provides the packet to one of several weighted queues. In one embodiment, an operator manually configures the weight for each queue. In another embodiment, router 400 may automatically configure the weight for each queue based on the amount of traffic for different kinds of packets that are forwarded.

Also, mapping module 410 may be employed to check the overload condition of the particular queue previously weighted to forward packets with the kind of data included in the current packet. However, if the amount of overloading of the weighted queue exceeds a threshold value, mapping module 410 employs traffic aggregation and forwarding priority values to determine if the packet should be remapped to another queue that is less loaded and normally weighted to forward packets that include a different kind of data. When mapping module 410, determines that remapping should occur, the current packet is provided to the other weighted queue for forwarding to the next destination.

FIG. 7 illustrates the mathematics and operational logic for remapping equation 700 as applied to a process with two weighted queues. FIG. 8 shows table 800 that describes in greater detail what each variable represents for remapping equation 700, as illustrated in FIG. 7. It is understood that remapping equation 700 is shown for exemplary purposes. Although not shown, in another embodiment, another remapping equation would be used to perform substantially the same actions of comparing the overloading of three or more weighted queues in a router to a threshold value(s).

Scheduler module 416 is coupled to all "N" weighted queues 414 and based on the weighting of the queues, received packets are provided to packet transmission module 418 for forwarding to the next destination on WAN 420.

Figure 4:
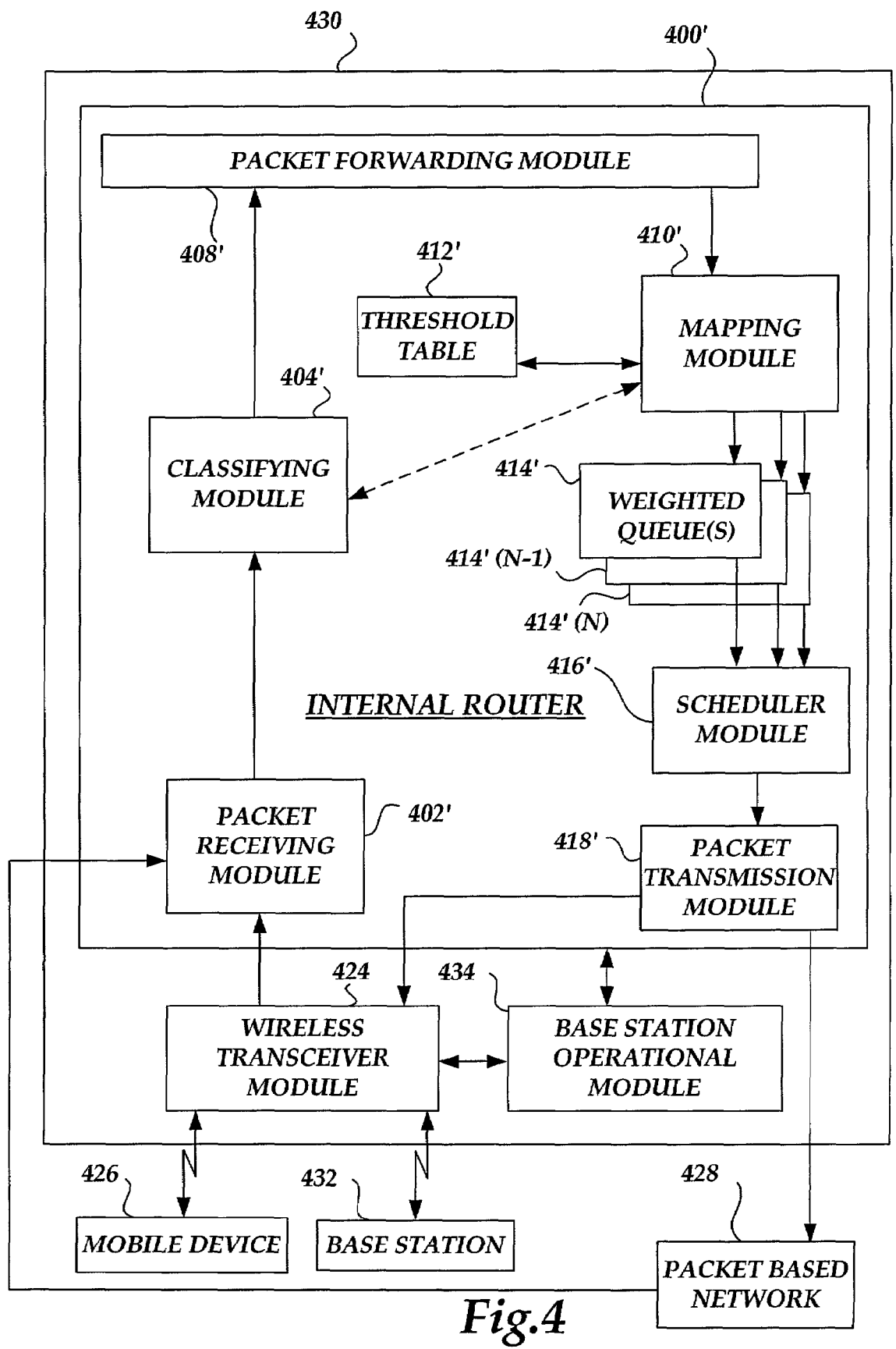
FIG. 4 illustrates another functional block diagram of a router that is internal to a base station and operative to remap packets from one queue to another queue under certain loading conditions.

FIG. 4 shows a functional block overview of at least some of the modules, tables and queues that are employed in the operation of an internal router 400' that is included in base station 430, and which operates substantially similar to external router 400 as illustrated in FIG. 3. Base station 430 is shown in communication with mobile device 426, another base station 432 and packet based network 428 (such as a WAN or a LAN). Wireless communication between mobile device 426 and base station 430 is managed by wireless transceiver module 424, which is coupled to packet receiving module 402'.

Other wireless communication from base station 432 is also managed by wireless transceiver 424. The wireless communication managed by wireless transceiver module 424 is packetized and provided to packet receiving module 402'. Packet based network 428 provides communications in packets to packet receiving module 402'. Additionally, base station operational module 434 is employed to manage the overall operation of base station 430 including the operation of internal router 400' and wireless transceiver module 424.

Each received packet is forwarded to classifying module 404' by packet receiving module 402'. Classifying module 404' determines the kind of data included in the provided "packets" and may also determine the source of each packet, such as mobile device 426 or base station 432. Classifying module 404' communicates this information to mapping module 410'. Also, each packet is provided to packet forwarding module 408' for further processing as described in the discussion of FIG. 3 above.

Once received packets are arranged in their respective weighted queues, in an ordered manner scheduler module 416' provides each packet to packet transmission module 418'. When a provided packet was received from packet based network 428, packet transmission module 418' forwards the packet to wireless transceiver module 424, where the packet is converted into a wireless format and broadcast to the ultimate destination, such as mobile device 426 or other base station 432. Alternatively, when the packet is received from mobile device 426 or other base station 432, packet transmission module 416' may provide the received packet to packet based network 428.

With few exceptions, the other modules and tables for internal router 400' operate in substantially the same manner as described above for similar modules in external router 400. Additionally, several mobile devices and other base stations may be in wireless communication with base station 430. Also, several different types of packet based networks may be coupled to and in communication with base station 430.

ReMapping of Packets to Reduce Overloading

Figure 5:
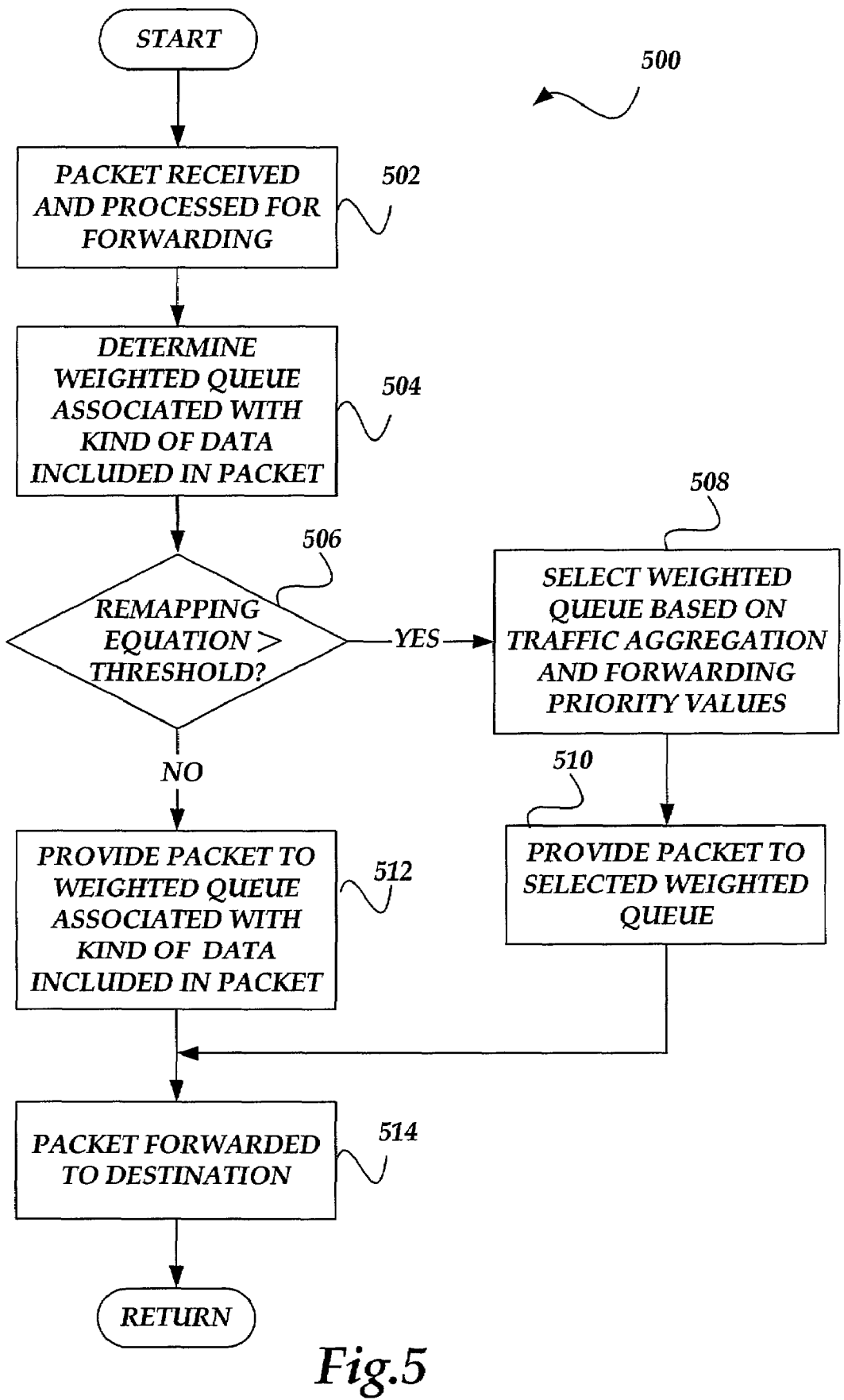
FIG. 5 shows a flow chart illustrating the process for remapping packets from one queue to another queue under certain loading conditions.

FIG. 5 illustrates a general overview of the process for implementing actions for the dynamic remapping of a received packet to a different queue for forwarding to the next destination during an overload condition. Moving from a start block, the process advances to block 502 where the packet is received from a network. The process determines the kind of data included in the packet and its next destination on another network. The process flows to block 504, where the kind of data included in the packet is employed to determine one of a plurality of weighted queues that will be used to forward the packet to the next destination on the other network. The weights for the queues may be configured manually by an operator, or in the alternative, they may be automatically configured based at least in part on the traffic flow of packets that include different kinds of data.

Next, the process moves to a decision block 506 where a determination is made as to whether the determined value of a remapping equation exceeds some previously configured threshold value. The remapping equation is employed to check the overload condition of the particular queue previously weighted to forward a packet with the kind of data included in the current packet. An operator may manually configure the threshold value. Alternatively, the threshold value may be automatically configured based at least in part on the traffic flow of packets that include different kinds of data. Further details regarding the processing of various actions at decision block 506 are explained in the discussion of FIG. 6 below.

Briefly, when the determined value of the remapping equation is less than the threshold value, the process steps to block 512 where the packet is provided to the weighted queue associated with the kind of data included in the packet. Then, the process moves to block 514 where the packet is forwarded to the next destination and it returns to processing other actions.

Alternatively, when the determined value of the remapping equation is found to be greater than the threshold value, the process advances to block 508 where traffic aggregation values and priority forwarding values are employed to determine if the current packet should be remapped to another queue that is less loaded and normally used/weighted to forward packets that include a different kind of data. Depending on these values, the process selects either the other weighted queue or the original weighted queue to handle the forwarding of the current packet. The process employs the conditional logic for the remapping equation shown in FIG. 7 to select the weighted queue. The elements of the conditional logic for the remapping equation are explained in greater detail and illustrated in FIG. 8.

The process flows to block 510 where the current packet is provided to the selected (weighted) queue for forwarding to the next destination. Advancing to block 514, the process forwards the packet to the destination on the other network and returns to processing other actions.

Figure 6:
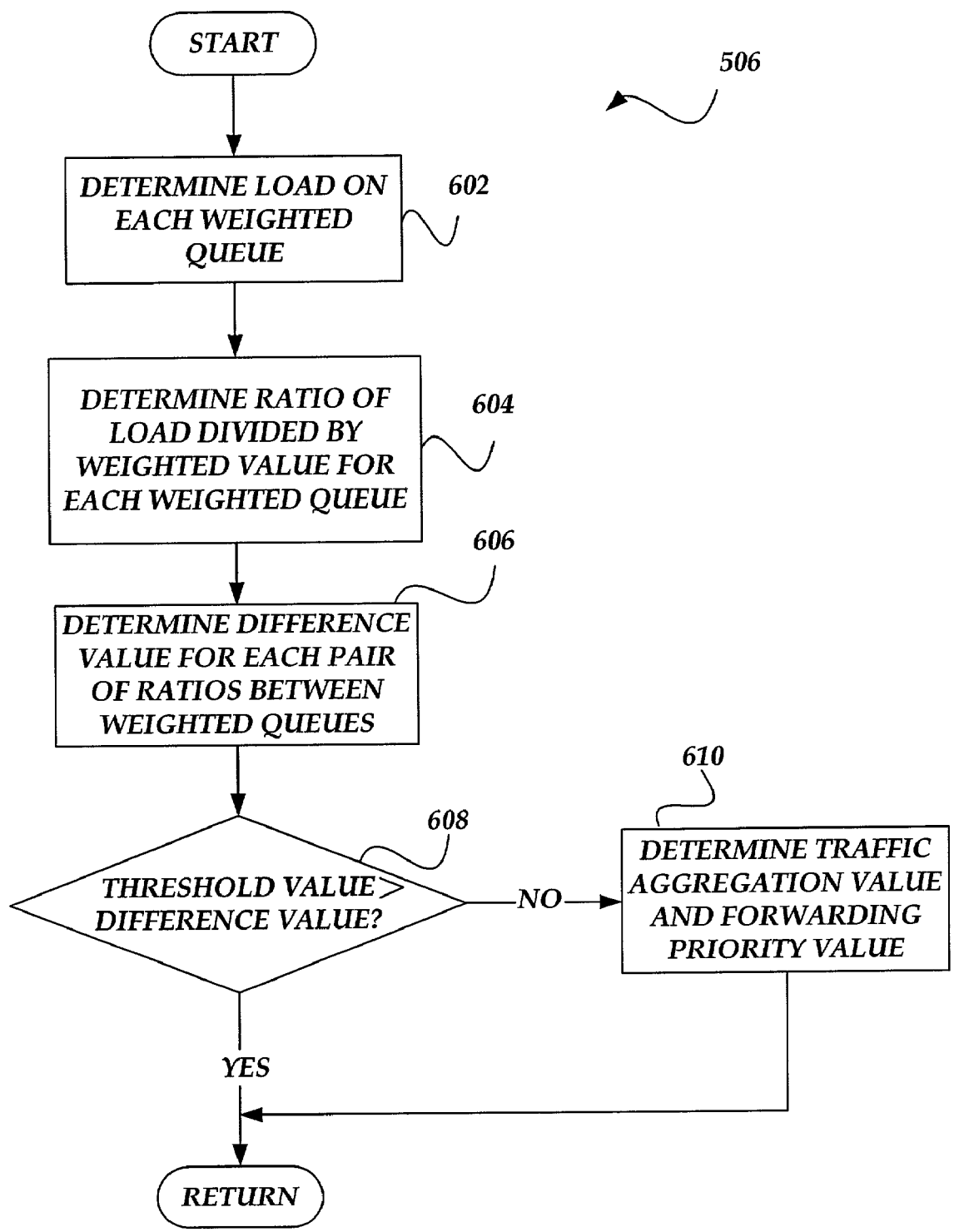
FIG. 6 illustrates another flow chart illustrating the process for determining when certain loading conditions have occurred.

FIG. 6 illustrates in greater detail the actions for determining the remapping equation and related values as mentioned briefly in the discussion of block 506 for FIG. 5. Moving from a start block, the process flows to block 602 where the load on each weighted queue is determined. At block 604, a ratio of the load divided by the weight is calculated for each weighted queue. Advancing to block 606, the process calculates a difference value by subtracting the ratio calculated for the weighted queue associated with the kind of data included in the current packet from another ratio calculated for another weighted queue associated with packets that include another kind of data.

Next, at decision block 608, the process determines if a predetermined threshold value is greater than the calculated difference value. Optimally, the threshold value is set to a relatively large value to prevent overloading of the other weighted queue. Unless the threshold value is set to the relatively large value, an overloading condition could be caused in the other weighted queue by frequent remapping of received IP packets.

If the determination at decision block 608 is true, the process returns to processing other actions at block 512 in FIG. 5. However, when the determination is negative, the process moves to block 610 where the traffic aggregation value and the forwarding priority value are determined for the current packet. Typically, the values are one or greater, with one being the highest value for both the forwarding priority value and the traffic aggregation value. Next, the process returns to processing other actions at block 508 as illustrated in FIG. 5 and discussed above.

Additionally, although the discussion above describes practicing some embodiments of the invention with Internet Protocol (IP) packets, it can also be practiced with other types of packets, including, Asynchronous Transfer Mode (ATM) packets, and the like.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method, comprising:
   mapping each received packet to at least one of a plurality of queues, wherein the mapping is based on a kind of data included with each of the received packet;
   providing a threshold that is compared to a differential that represents loading differences between a queue associated with the kind of data included in the received packet and another queue that is unassociated with the kind of data included in the received packet, wherein the queue associated with the kind of data included in the received packet is overloaded when the differential exceeds the threshold;
   when the differential exceeds the threshold, and operational logic is valid, automatically changing the mapping of the received packet from the queue to the other queue, wherein the other queue is less loaded than the queue associated with the kind of data included in the received packet when the differential exceeds the threshold; and
   forwarding each of the received packet in each said queue along a path towards the final destination, wherein the ordering of the forwarding of each of the received packet is in accordance with a weight associated with each said queue.

2. The method of claim 1, wherein the received packet is one of an internet protocol packet and an asynchronous transfer mode packet.

3. The method of claim 1, further comprising:
   providing the weight for each said queue that is associated with each kind of data,
   wherein resources for forwarding each of the received packet in each said queue are allocated in accordance with each weight provided to each said queue, and
   wherein the weight associated with each said queue is unchanged during the forwarding.

4. The method of claim 1, further comprising:
   employing a remapping equation to determine when the differential exceeds the threshold and the operational logic is valid.

5. The method of claim 1, wherein the operational logic determines when both a forwarding priority value and a traffic aggregation value are greater for the received packet initially mapped to the queue associated with the kind of data included with the received packet than another forwarding priority value and another traffic aggregation value associated with each of the received packet in the other queue that is unassociated with the kind of data included in the received packet.

6. The method of claim 1, further comprising:
enabling automated provisioning of at least one of a forwarding priority value, traffic aggregation value and weight for each said queue based on the kind of data included in each of the received packet.

7. The method of claim 1, further comprising:
enabling the threshold to be set to a sufficiently large value to prevent overloading of the other queue caused by relatively frequent changing of the mapping of received packets to the other queue.

8. The method of claim 1, further comprising:
employing a connection associated with the received packet to determine the kind of data included in the received packet.

9. The method of claim 1, further comprising:
examining the content of the received packet to identify the kind of data included in the received packet.

10. The method of claim 1, wherein the mapping is based on Diffserv code points.

11. A router, comprising:
a transceiver configured to receive and transmit each packet over each network coupled to the router;
a mapper configured to map each received packet to at least one of a plurality of queues based on a kind of data included with each of the received packet;
a remapper configured to compare a provided threshold to a differential that represents loading differences between a queue associated with the kind of data included in the received packet and another queue that is unassociated with the kind of data included in the received packet, wherein the queue associated with the kind of data included in the received packet is overloaded when the differential exceeds the threshold wherein the remapper is configured to change automatically the mapping of the received packet from the queue to the other queue when the differential exceeds the thresholds and operational logic is valid, wherein the other queue is less loaded than the queue associated with the kind of data included in the packet when the differential exceeds the threshold; and
a scheduler configured to forward each of the received packet in each said queue along a path towards the final destination, wherein the scheduler is configured to order the forwarding of each received packet in accordance with a weight associated with each said queue.

12. The router of claim 11, further comprising:
a base station that includes a wireless transceiver for wirelessly communicating with mobile devices and other base stations, wherein the router is internal to the base station.

13. The router of claim 11, further comprising:
a classifier for determining the kind of data included in each of the received packet.

14. The router of claim 13, wherein the classifier is configured to employ a connection associated with the received packet to determine the kind of data included in the received packet.

15. The router of claim 13, wherein the classifier is configured to examine the content of the received packet to identify the kind of data included in the received packet.

16. The router of claim 11, further comprising:
a weighter configured to enable a weight to be provided for each said queue that is associated with each kind of data, wherein resources for forwarding each of the received packet in each said queue are allocated in accordance with each of the weight provided to each said queue.

17. The router of claim 11, wherein the threshold is set to a value sufficiently large to prevent overloading of the other queue caused by relatively frequent changing of the mapping of received packets to the other queue.

18. The router of claim 11, wherein the operational logic is configured to determine when both a forwarding priority value and a traffic aggregation value are greater for the received packet initially mapped to the queue associated with the kind of data included with the received packet than another forwarding priority value and another traffic aggregation value associated with each of the received packet in the other queue that is unassociated with the kind of data included in the received packet.

19. The router of claim 11, further comprising:
a provisioner configured to provide automatically at least one of a forwarding priority value, traffic aggregation value and weight for each said queue based on the kind of data included in each of the received packet.

20. The router of claim 11, wherein the mapping is based on Diffserv code points.

21. The router of claim 11, wherein the packet is one of an internet protocol packet and an asynchronous transfer mode packet.

22. An apparatus, comprising:
means for mapping each received packet to at least one of a plurality of queues, wherein the mapping is based on a kind of data included with each of the received packet;
means for providing a threshold that is compared to a differential that represents loading differences between a queue associated with the kind of data included in the received packet and another queue that is unassociated with the kind of data included in the received packet, wherein the queue associated with the kind of data included in the received packet is overloaded when the differential exceeds the threshold;
means for automatically changing the mapping of the received packet from the queue to the other queue when the differential exceeds the thresholds and operational logic is valid, wherein the other queue is less loaded than the queue associated with the kind of data included in the packet when the differential exceeds the threshold; and
means for forwarding each of the received packet in each said queue along a path towards the final destination, wherein the ordering of the forwarding of each of the received packet is in accordance with a weight associated with each said queue.

* * * * *